United States Patent [19]
Sato et al.

[11] Patent Number: 4,842,395
[45] Date of Patent: Jun. 27, 1989

[54] FINDER OF VARIABLE MAGNIFICATION

[75] Inventors: Yasuhisa Sato, Kanagawa; Nozomu Kitagishi; Yasuyuki Yamada, both of Tokyo; Hiroki Nakayama; Kouji Oizumi, both of Kanagawa, all of Japan

[73] Assignee: Canon Kabushiki Kaisha, Tokyo, Japan

[21] Appl. No.: 159,471

[22] Filed: Feb. 19, 1988

Related U.S. Application Data

[63] Continuation of Ser. No. 814,092, Dec. 27, 1985, abandoned.

[30] Foreign Application Priority Data

Dec. 27, 1984 [JP] Japan ................................ 59-280574

[51] Int. Cl.$^4$ ........................................... G02B 15/177
[52] U.S. Cl. .................................... 350/519; 350/425; 350/556; 350/560; 350/570
[58] Field of Search ................................ 350/425–426, 350/519, 523, 555–556, 559, 560, 561, 570, 572; 354/155, 201, 219, 222, 225

[56] References Cited

U.S. PATENT DOCUMENTS

| 1,091,933 | 3/1944 | Humbrecht | 350/560 |
| 3,656,421 | 4/1972 | Ataka | 354/155 |
| 4,047,207 | 9/1977 | Altman et al. | 354/225 |
| 4,063,261 | 12/1977 | Kuboshima | 354/155 |
| 4,573,781 | 3/1986 | Kato | 354/201 |

FOREIGN PATENT DOCUMENTS

| 1291614 | 3/1969 | Fed. Rep. of Germany | 354/155 |
| 62611 | 4/1983 | Japan | 350/570 |

Primary Examiner—Bruce Y. Arnold
Assistant Examiner—Martin Lerner
Attorney, Agent, or Firm—Toren, McGeady & Associates

[57] ABSTRACT

The disclosed variable magnification finder includes, from front to rear, a first lens unit of negative power, a second lens unit of positive power, a third lens unit of positive power, the first, second and third lens units constituting an objective lens of positive power, and an eyepiece of positive power. The first and second lens units form a finder image on a plane just in front of the third lens unit. The second lens unit is moved axially forward to increase the image magnification, while the shift of diopter of the finder is simultaneously compensated for by moving the first lens unit.

21 Claims, 11 Drawing Sheets

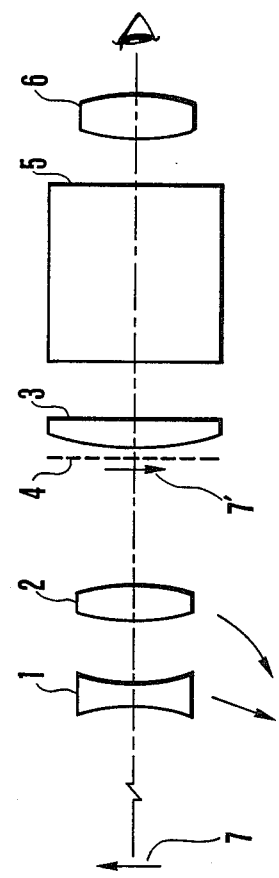
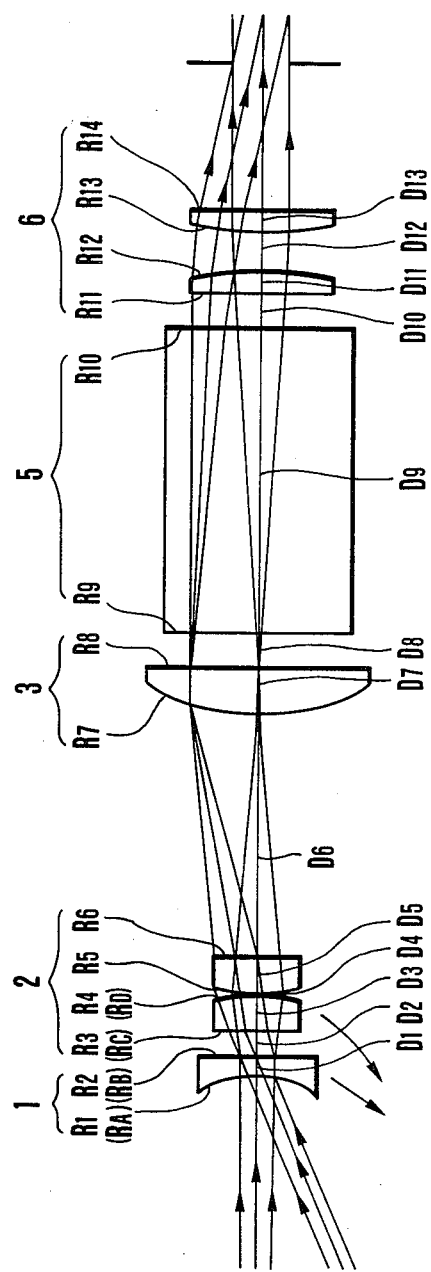

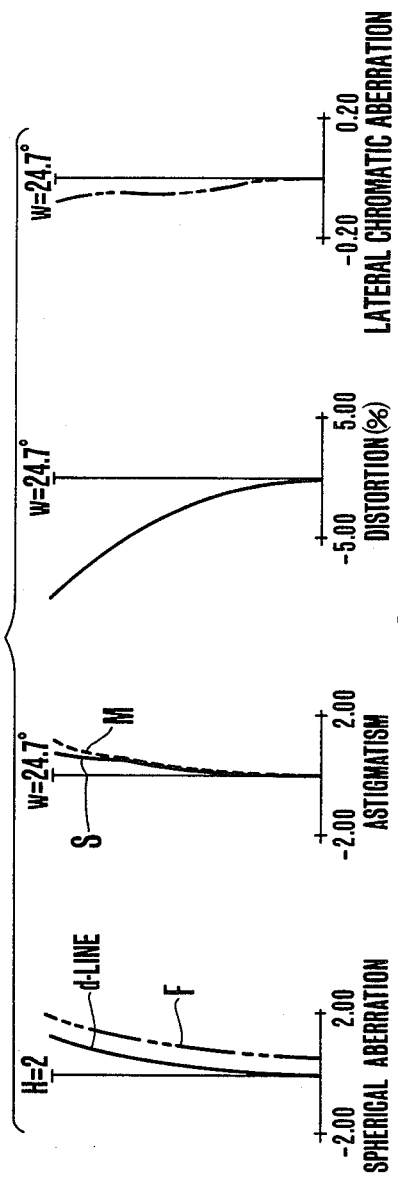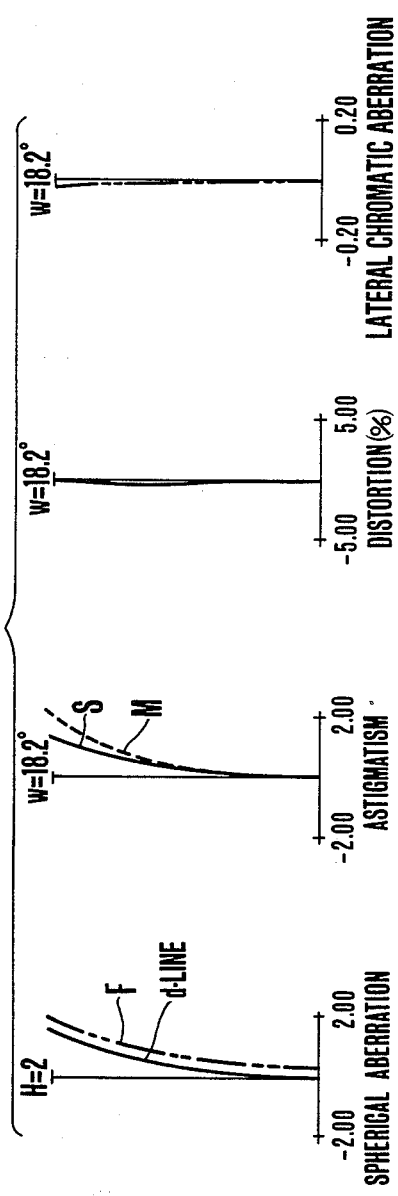

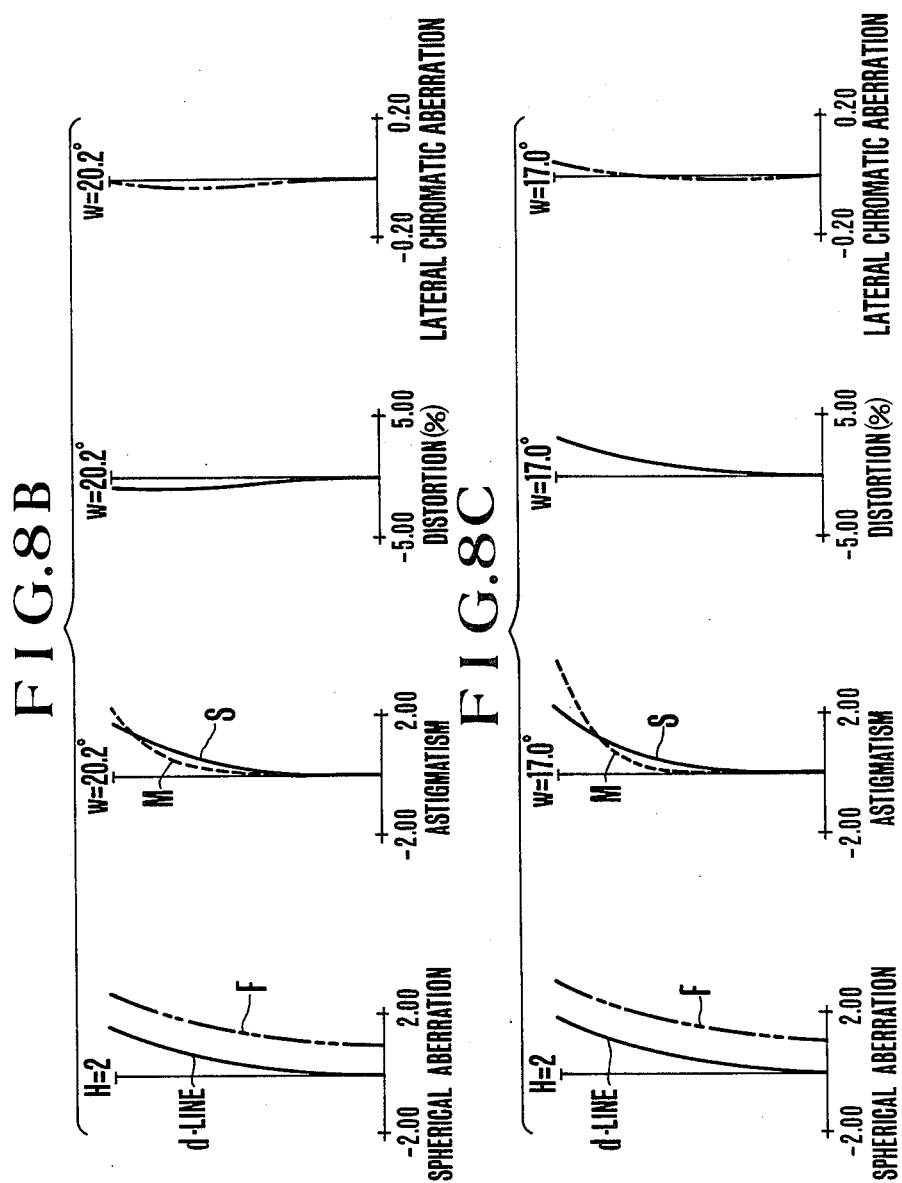

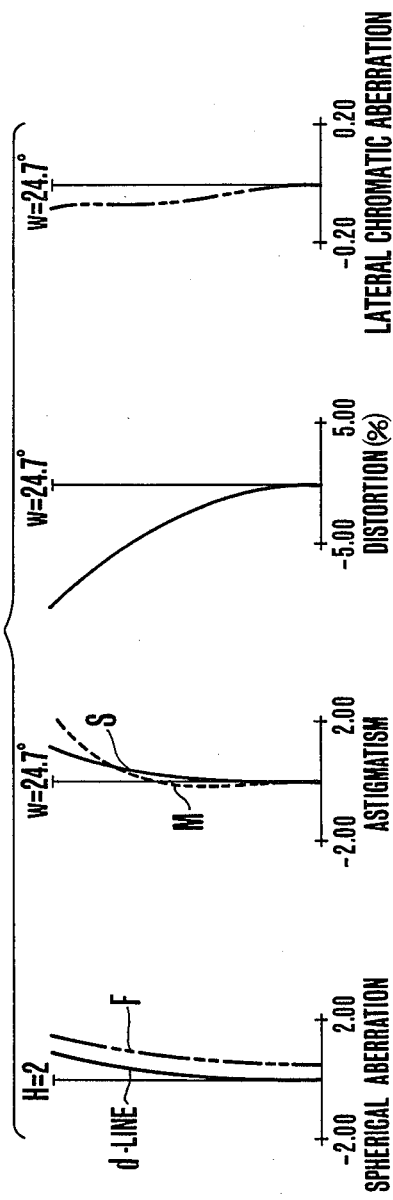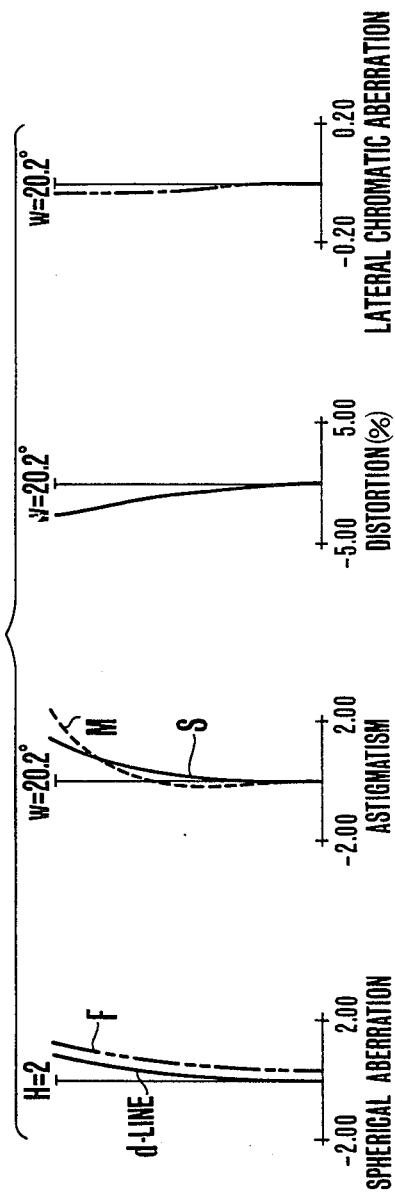

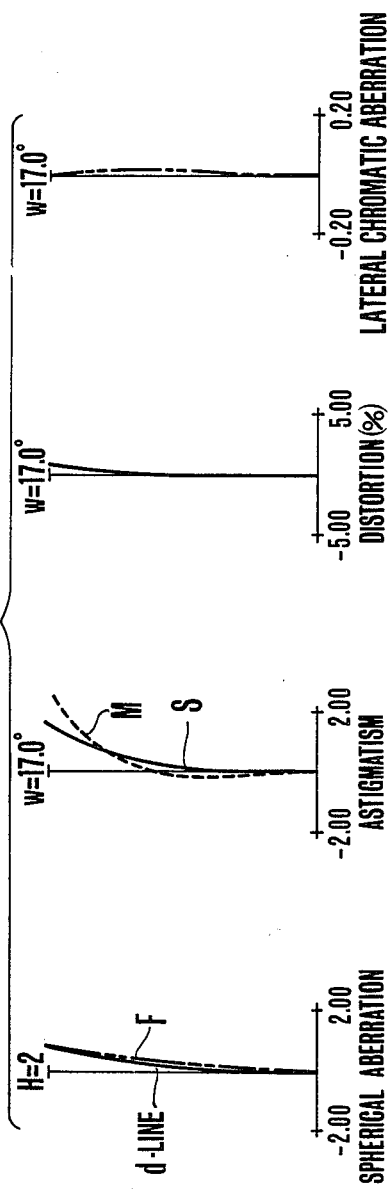
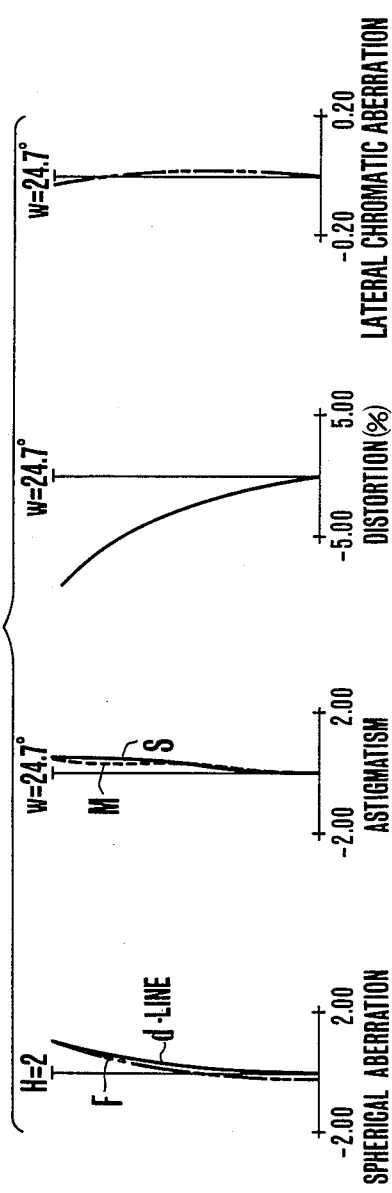

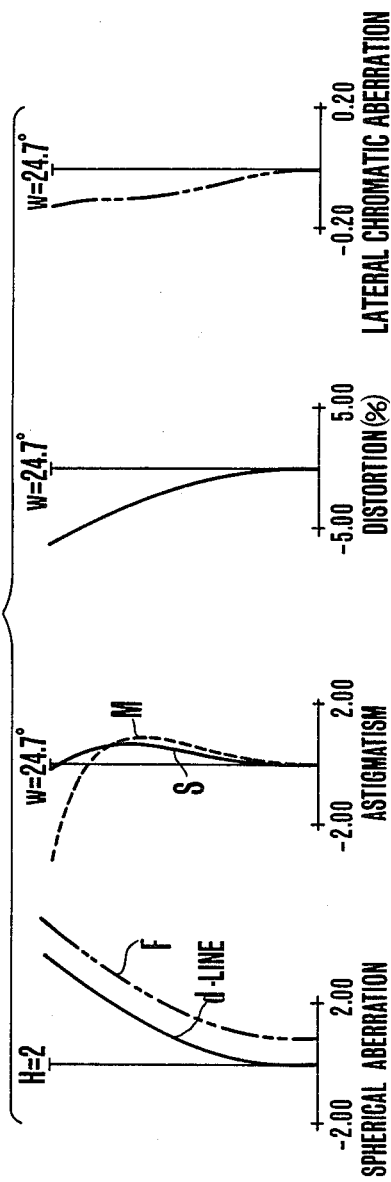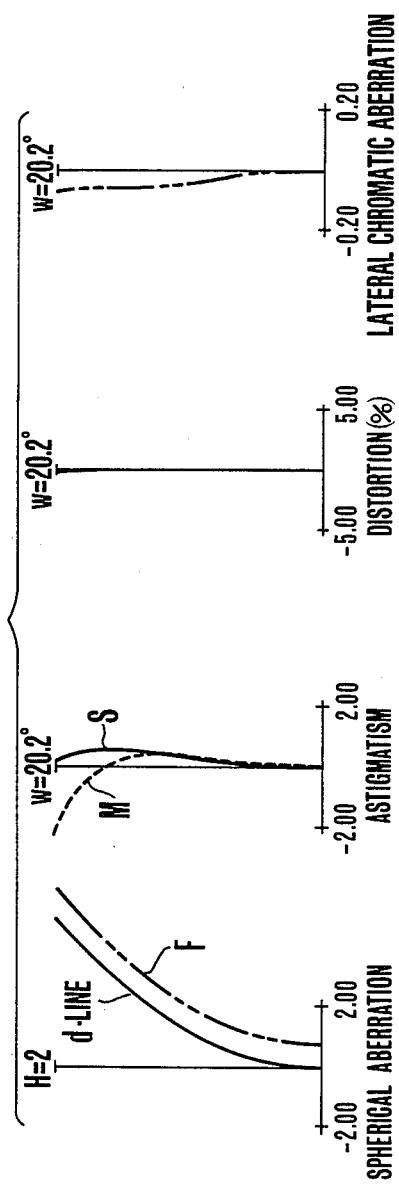

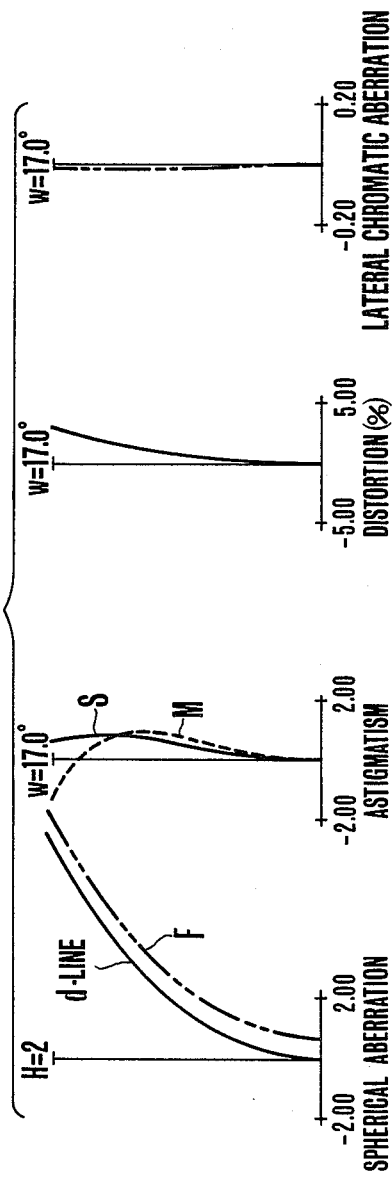
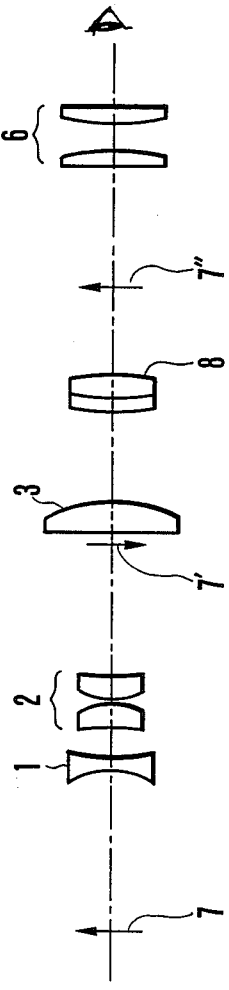
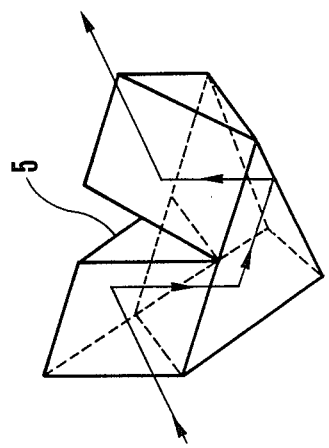
FIG.11C
FIG.12
FIG.13

FINDER OF VARIABLE MAGNIFICATION

This is a continuation of application Ser. No. 811,092, filed Dec. 27, 1985. now abandoned.

BACKGROUND OF THE INVENTION

This invention relates to variable magnification finders, and more particularly to variable magnification finders which maintain the diopter of the finder constant, and which are suited for use in photographic cameras or video cameras.

DESCRIPTION OF THE PRIOR ART

The photo-taking and finder systems of prior art cameras are sometimes constructed separately. In zoom-type photo-taking systems, the problem of framing makes it desirable to vary the magnification of the finder image in conformity with the focal length of the photo-taking system. When the finder is built into the camera, the finder should be small and constructed so the required range of values of magnification can be readily obtained.

Japanese Laid-Open Patent Application No. SHO 53-63014, proposes a reverse-Galilean finder constructed, from front to rear, with an objective lens of negative power and an eyepiece of positive power. The objective lens includes two lens units of positive and negative power and the negative lens unit moves toward the eyepiece to vary the magnification. However, the reverse-Galilean finders generally are disadvantageous in that the view field of the finder changes, depending on the position of the eye, and blurs in the marginal zone, because the objective lens forms a virtual image which is observed by the eyepiece.

The Kepler-type finder, on the other hand, is meritorious because the objective lens of positive power can form a real finder image. When a field mask is positioned on the focal plane of the objective lens, the outline of the viewfield is very clear, and the position of the eye does not affect the framing of the finder view field. However, because the Kepler-type finder necessarily forms the real image in front of the eyepiece, it is comparatively large. Another disadvantage is that preservation of good optical performance tends to increase the complexity of the construction of the finder. This tendency is particularly prominent when the magnification varying capability is introduced into the Kepler-type finder.

SUMMARY OF THE INVENTION

An object of the present invention is to provide a Kepler-type variable magnification finder which despite a simple form of construction, enables a desired range of magnifications, while still permitting good optical performance throughout the range.

BRIEF DESCRIPTION OF THE DRAWINGS

FIG. 1 is a schematic longitudinal section view of an embodiment of an optical system according to the invention.

FIGS. 2 to 6 are block diagrams of five examples 1 to 5 of specific optical systems of the invention respectively.

FIGS. 7A-7C to 11A-11C are graphic representations of the aberrations of the optical systems of FIGS. 2 to 6 respectively.

FIG. 12 is a schematic longitudinal section view of another embodiment of the optical system according to the invention.

FIG. 13 is a perspective view of a Porro prism usable in the invention.

DETAILED DESCRIPTION OF THE PREFERRED EMBODIMENTS

Figure 3:
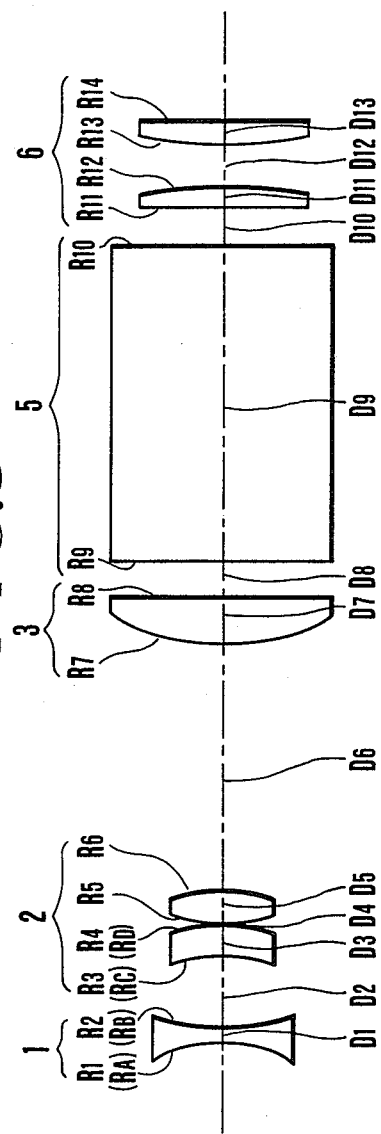
Figure 4:
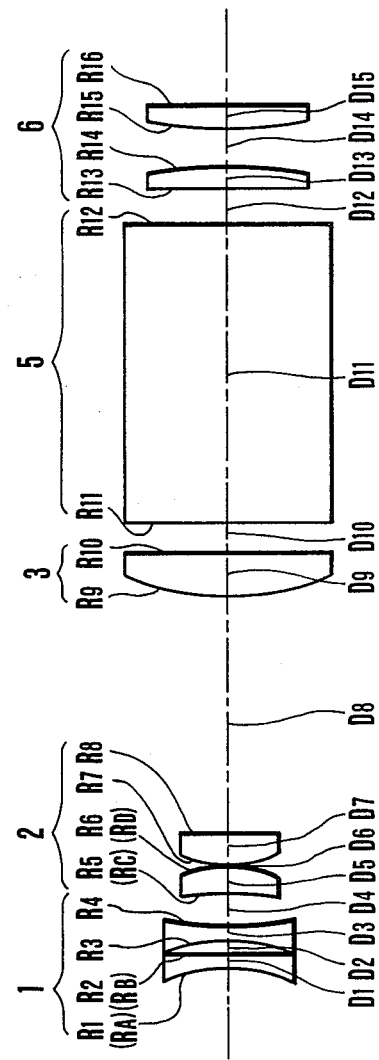
Figure 5:
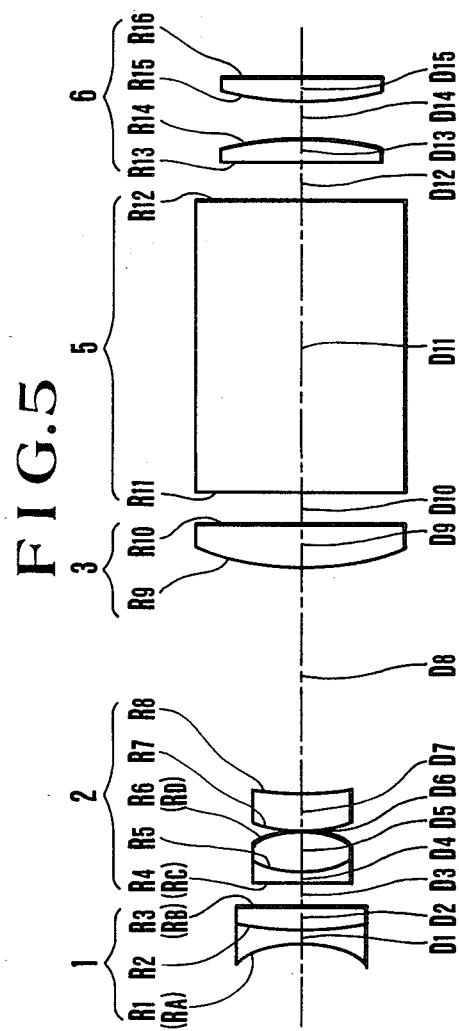
Figure 6:
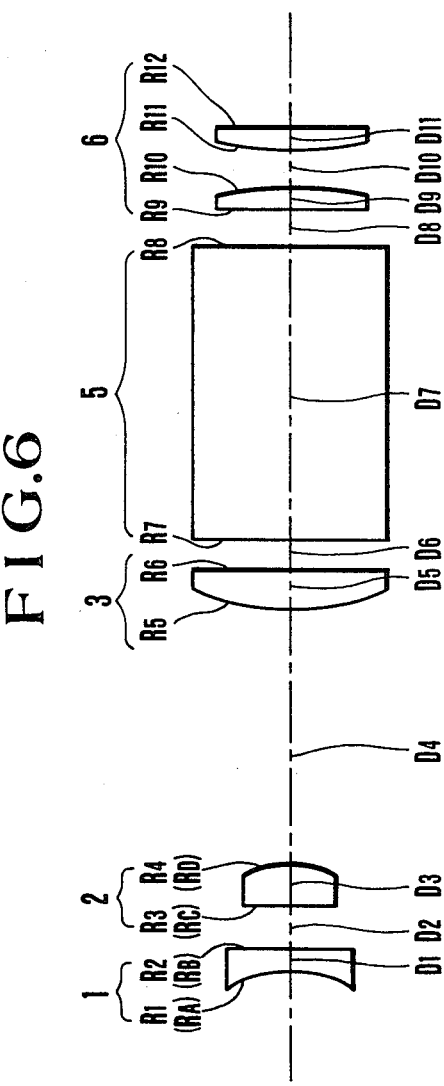

The present invention will next be described in connection with embodiments thereof. The variable magnification finders shown in FIGS. 1 to 6 and 12 each comprise, from front to rear, a first lens group or unit of negative power, a second lens group or unit of positive power, a third lens unit of positive power, these three lens units constituting an objective lens of overall positive power, and an eyepiece of positive power, the first and second lens group or units forming a real image of an object on a plane just in front of the third lens unit, whereby the second lens group or unit is made to move axially to vary the magnification of the image, while the change of the finder diopter resulting from such movement of the second lens group or unit is compensated for by moving the first lens unit.

The features of the invention are described in detail below by reference to FIG. 1. In FIG. 1, the first to third lens group or units of the objective are denoted by reference numerals 1 to 3 respectively. In this embodiment, the second lens group or unit 2 is made to move forward as indicated by an arrow to vary the magnification of the finder image, and the first lens group or unit is made simultaneously to move as shown by another arrow to compensate for the change of the diopter resulting from the movement of the second lens unit. The third lens unit is held stationary during variation of the magnification, and arranged adjacent a focal plane 4 of the combined system of the first and second lens units to collect rays of light in the axial direction, similar to the so-called field lens. A Porro prism 5 for reversing the finder image vertically and horizontally though will be shown in real form in FIG. 13, is shown in FIG. 1 in an axially expanded block form of the purpose of simplicity. Reference numeral 6 denotes an eyepiece of positive power. Reference numeral 7 denotes an object. Reference numeral 7' denotes a real finder image formed adjacent the third lens unit by the first and second lens groups or units 1 and 2.

In this embodiment, the objective lens in divided into three lens groups, of which the first lens group or unit 1 is made negative in refractive power, and the second lens group or unit 2 is made positive, whereby the first and second lens groups or units are so arranged that a real finder image is formed which facilitates good correction of aberrations for improvement of the quality of the finder image. Also, by moving both of the first and second lens groups or units 1 and 2 forward when the magnification is changed, a required value for zoom ratio is readily obtained.

Putting the finder image adjacent the third lens unit 3 having a function similar to that of the field lens produces another advantage in that the finder beam is prevented from expanding and a minimization of the size of that part of the finder system which follows the objective lens is achieved. The inverted finder image is then observed as an erecting image by the Porro prism 5 and in an enlarged scale by the eyepiece 6.

The foregoing features suffice for accomplishing the object of the invention. Yet, in order to increase the range of magnifications, while still preserving good imaging performance, a first lens $L_{1\text{-}1}$ counting from the front in the first lens unit 1 is made negative in power with its front surface concave toward the front, and a first lens $L_{2\text{-}1}$ counting from the front in the second lens unit 2 is made positive in power with its rear surface convex toward the rear, these two lenses $L_{1\text{-}1}$ and $L_{2\text{-}1}$ satisfying the following conditions:

$$-0.8 \leq \frac{R_A}{R_B} \leq 0.5 \tag{1}$$

$$-0.5 \leq \frac{R_D}{R_C} < 0.8 \tag{2}$$

where $R_A$ and $R_B$ are the radii of curvature of the front and rear surfaces of the lens $L_{1\text{-}1}$ respectively, and $R_C$ and $R_D$ are the radii of curvature of the front and rear surfaces of the lens $L_{2\text{-}1}$ respectively.

By using the lens $L_{1\text{-}1}$ of negative power constructed so that the front surface is concave toward the front and the inequalities of condition (1) are satisfied, coma in the telephoto end is satisfactory corrected. When the upper limit is exceeded, as the curvature of the front surface becomes too strong, downward coma in the telephoto end is increased. When the lower limit is exceeded, as the front surface curvature $R_A$ becomes too weak, conversely, upward coma in the telephoto end is increased, and curvature of field is also extremely over-corrected.

With the use of the lens $L_{2\text{-}1}$ constructed so that the rear surface turns its convex curvature toward the eyepiece and the inequalities of condition (2) are satisfied, coma in the wide angle end is well corrected. When the upper limit is exceeded, the rear surface curvature $R_D$ becomes too strong and, halo by the upper rays is increased in the telephoto end. When the lower limit is exceeded, as the rear surface curvature $R_D$ becomes too weak, downward coma appears in the wide angle end.

In general, if the finder system has uncorrected the image sways when the observer moves his eye. For this reason, in the embodiment of the invention, the above-stated features have been set forth for the configuration of each of those lenses which play an important role in particularly correcting coma. Thus, a good finder image free from swaying when the eye is moved slightly is obtained.

The present invention, despite a simple form of construction, has to achieve minimization of variation of aberrations with variation of the magnification for high grade imagery over the entire range of magnifications. To this end, it is preferred to construct the first and second lens group or units in such a way that either (1) a singlet of negative power with its front surface concave toward the front constitutes the first group or unit 1, and another singlet of positive power with its rear surface convex toward the rear constitutes the second group unit 2, or (2) a bi-concave singlet constitutes the first group or unit 1, while two lenses of positive power of which the first has its rear surface convex toward the rear constitute the second group unit 2, or (3) a meniscus-shaped lens of negative power concave toward the front and a bi-concave lens constitute the first group unit 1, while two lenses of positive power of which the first has its rear surface convex toward the rear, and the second has its front surface convex toward the front constitute the second unit 2, or (4) a bi-concave lens and bi-convex lens either in separation or in cemented form, constitute the first unit 1, while a bi-concave lens and a bi-convex lens either in separation or in cemented form constitute the second unit 2 together with an additional lens of meniscus shape of positive power convex toward the front. As to the third lens unit 3, it is preferred to construct it in the form of a singlet of positive power with its front surface having a stronger refractive power than that of the rear surface thereof. The eyepiece 6 is preferably constructed with at least two lenses of positive power.

Though the foregoing embodiment has been described as using the Porro prism 5 to form a correct finder image, this member is not always necessary, for example, when the invention is applied to astronomical telescope sights where the inverted image will not matter. Instead of the Porro prism 5 it is also possible to use an erecting lens unit 8, as in another embodiment shown in FIG. 12, where the finder image 7' is re-focused to form a second finder image 7'' which is observed through the eyepiece.

In the invention, each lens may be made of synthetic resin material using molding techniques, giving the advantage of manufacturing the lenses to any desired form very economically. Also, at least one of the lens surfaces in the first and second lens units 1 and 2 may be made aspherical, thereby giving the advantage of satisfactorily correcting aberrations such as distortion, astigmatism and halo.

As has been described in greater detail above, according to the present invention, the objective lens is made positive in refractive power, and divided into three lens units, or negative, positive and positive lens units in this order from the front, the first two of which move to vary the magnification of the finder image. Thereby, a Kepler type finder of variable magnification is realized which enables a high range of magnification to be achieved without causing the structure of construction and arrangement of the constituent elements to become unduly complicated, while nevertheless permitting high grade imagery to be maintained throughout the range.

Five examples of specific optical systems of the invention can be constructed in accordance with the numerical data given in the following tables for the radii of curvature, R, the axial thicknesses or air separations, D, and the refractive indices, N, and Abbe numbers, $\nu$, of the glasses of the lens elements, with the subscripts numbered consecutively from front to rear.

Figure 7C:
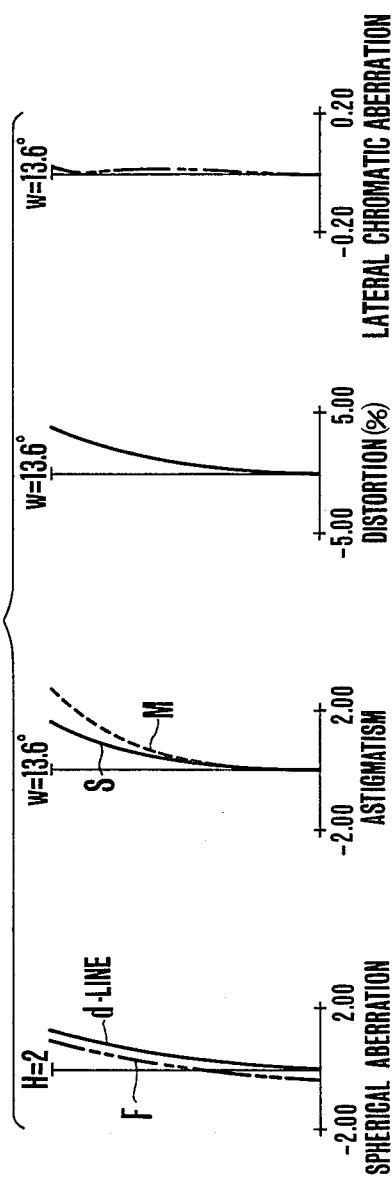

| Numerical Example 1 (FIGS. 2 and 7A–7C) | | | |
|---|---|---|---|
| $2\omega = 49.4°\text{-}27.2°$ | | | |
| R1 = −6.19 | D1 = 1.00 | N1 = 1.84666 | $\nu$1 = 23.9 |
| R2 = 61.16 | D2 = Variable | | |
| R3 = −32.31 | D3 = 2.50 | N2 = 1.77250 | $\nu$2 = 49.6 |
| R4 = −6.34 | D4 = 0.20 | | |
| R5 = 12.14 | D5 = 2.50 | N3 = 1.77250 | $\nu$3 = 49.6 |
| R6 = 32.87 | D6 = Variable | | |
| R7 = 15.50 | D7 = 3.00 | N4 = 1.77250 | $\nu$4 = 49.6 |
| R8 = −4385.48 | D8 = 2.11 | | |
| R9 = ∞ | D9 = 20.00 | N5 = 1.51633 | $\nu$5 = 64.1 |
| R10 = ∞ | D10 = 2.50 | | |
| R11 = ∞ | D11 = 1.50 | N6 = 1.62041 | $\nu$6 = 60.3 |
| R12 = −26.19 | D12 = 2.70 | | |
| R13 = 26.19 | D13 = 1.50 | N7 = 1.62041 | $\nu$7 = 60.3 |
| R14 = ∞ | | | |

| | $2\omega$ | | |
|---|---|---|---|
| D | 49.4° | 36.4° | 27.2° |
| D2 | 2.70 | 1.42 | 0.59 |
| D6 | 15.48 | 19.57 | 24.69 |

$R_A/R_B = -0.101$

-continued

Numerical Example 1
(FIGS. 2 and 7A-7C)

$R_D/R_C = 0.196$

Figure 8A:
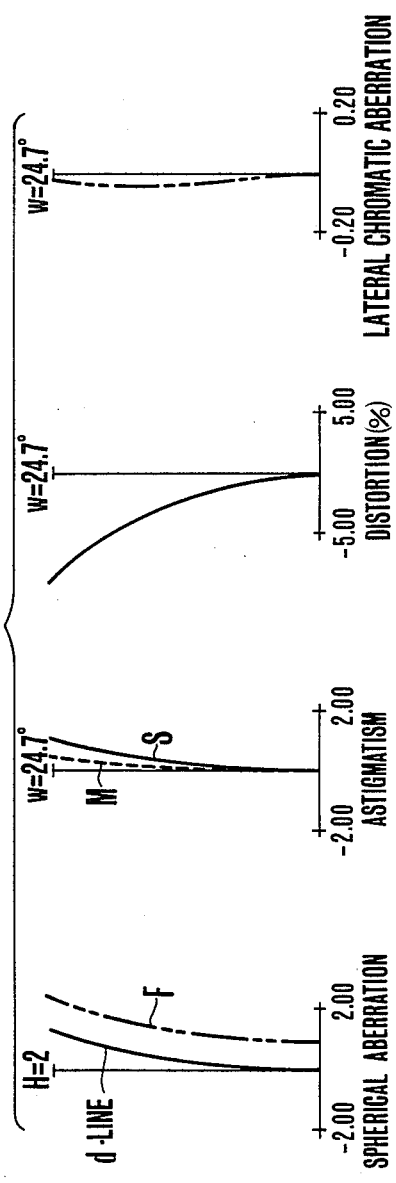

Numerical Example 2
(FIGS. 3 and 8A-8C)

$2\omega = 49.4°-34°$

| | | | |
|---|---|---|---|
| R1 = −7.73 | D1 = 1.00 | N1 = 1.49171 | ν1 = 57.4 |
| R2 = 17.68 | D2 = Variable | | |
| R3 = −9.30 | D3 = 2.00 | N2 = 1.49171 | ν2 = 57.4 |
| R4 = −5.63 | D4 = 0.20 | | |
| R5 = 14.01 | D5 = 2.00 | N3 = 1.49171 | ν3 = 57.4 |
| R6 = −11.75 | D6 = Variable | | |
| R7 = 11.00 | D7 = 3.00 | N4 = 1.49171 | ν4 = 57.4 |
| R8 = −84.45 | D8 = 2.00 | | |
| R9 = ∞ | D9 = 20.00 | N5 = 1.51633 | ν5 = 64.1 |
| R10 = ∞ | D10 = 2.50 | | |
| R11 = ∞ | D11 = 1.50 | N6 = 1.62041 | ν6 = 60.3 |
| R12 = −26.19 | D12 = 2.70 | | |
| R13 = 26.19 | D13 = 1.50 | N7 = 1.62041 | ν7 = 60.3 |
| R14 = ∞ | | | |

| | 2ω | | |
|---|---|---|---|
| D | 49.9° | 40.4° | 34° |
| D2 | 3.99 | 2.16 | 0.94 |
| D8 | 15.74 | 17.71 | 19.67 |

$R_A/R_B = -0.437$
$F_D/R_C = 0.607$

Numerical Example 3
(FIGS. 4 and 9A-9C)

$2\omega = 49.4°-34°$

| | | | |
|---|---|---|---|
| R1 = −9.64 | D1 = 1.00 | N1 = 1.84666 | ν1 = 23.9 |
| R2 = −51.56 | D2 = 0.72 | | |
| R3 = −13.44 | D3 = 1.00 | N2 = 1.84666 | ν2 = 23.9 |
| R4 = 84.76 | D4 = Variable | | |
| R5 = −15.67 | D5 = 2.00 | N3 = 1.77250 | ν3 = 49.6 |
| R6 = −6.16 | D6 = 0.20 | | |
| R7 = 11.94 | D7 = 2.00 | N4 = 1.77250 | ν4 = 49.6 |
| R8 = 318.13 | D8 = Variable | | |
| R9 = 15.50 | D9 = 3.00 | N5 = 1.77250 | ν5 = 49.6 |
| R10 = −4385.48 | D10 = 2.11 | | |
| R11 = ∞ | D11 = 20.00 | N6 = 1.51633 | ν6 = 64.1 |
| R12 = ∞ | D12 = 2.50 | | |
| R13 = ∞ | D13 = 1.50 | N7 = 1.62041 | ν7 = 60.3 |
| R14 = −26.19 | D14 = 2.70 | | |
| R15 = 26.19 | D15 = 1.50 | N8 = 1.62041 | ν8 = 60.3 |
| R16 = ∞ | | | |

| | 2ω | | |
|---|---|---|---|
| D | 49.4° | 40.4° | 34° |
| D4 | 1.97 | 1.08 | 0.49 |
| D8 | 16.09 | 18.65 | 21.21 |

$R_A/R_B = 0.187$
$R_D/R_C = 0.393$

Figure 10B:
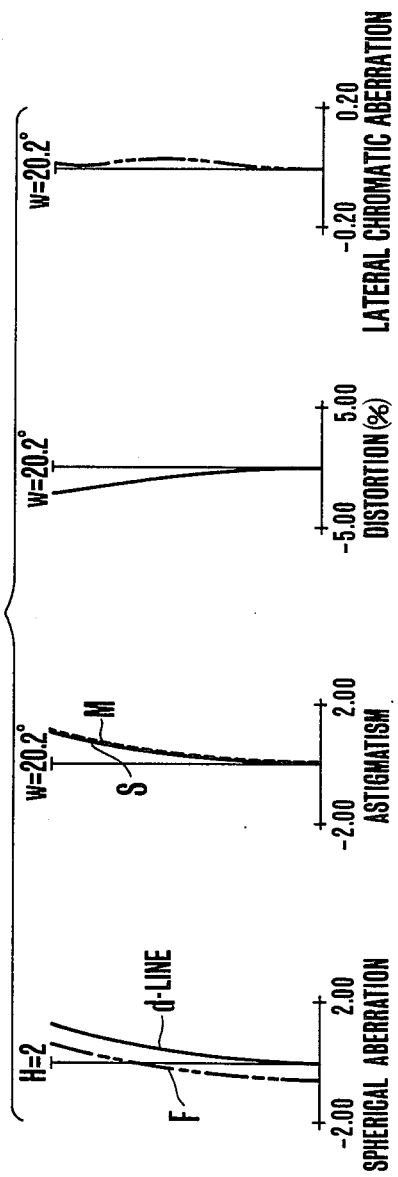
Figure 10C:
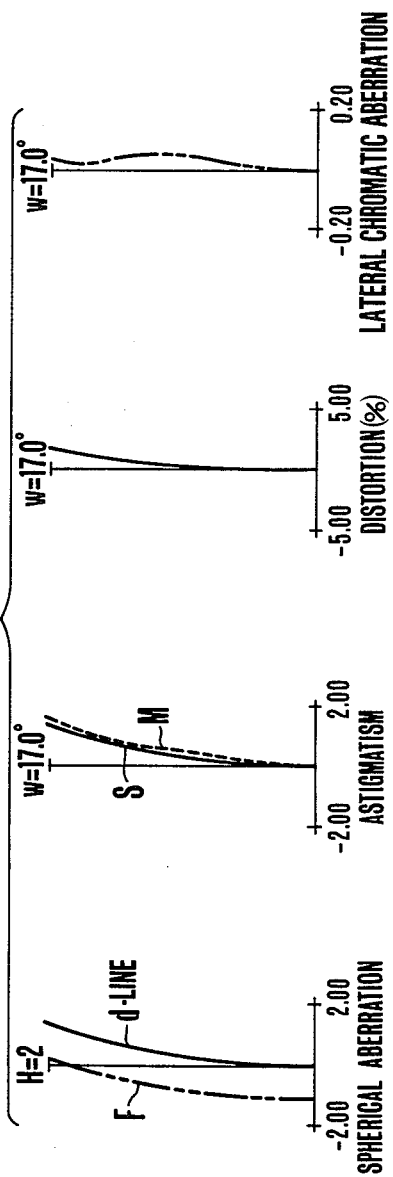

Numerical Example 4
(FIGS. 5 and 10A-10C)

$2\omega = 49.4°-34°$

| | | | |
|---|---|---|---|
| R1 = −5.77 | D1 = 0.70 | N1 = 1.84666 | ν1 = 23.9 |
| R2 = 38.00 | D2 = 1.50 | N2 = 1.60311 | ν2 = 60.7 |
| R3 = −393.77 | D3 = Variable | | |
| R4 = −58.89 | D4 = 0.80 | N3 = 1.80518 | ν3 = 25.4 |
| R5 = 9.09 | D5 = 2.50 | N4 = 1.77250 | ν4 = 49.6 |
| R6 = −6.62 | D6 = 0.20 | | |
| R7 = 11.12 | D7 = 2.50 | N5 = 1.77250 | ν5 = 49.6 |
| R8 = 23.65 | D8 = Variable | | |
| R9 = 15.50 | D9 = 3.00 | N6 = 1.77250 | ν6 = 49.6 |
| R10 = −4385.48 | D10 = 2.11 | | |

-continued

Numerical Example 4
(FIGS. 5 and 10A-10C)

| | | | |
|---|---|---|---|
| R11 = ∞ | D11 = 20.00 | N7 = 1.51633 | ν7 = 64.1 |
| R12 = ∞ | D12 = 2.50 | | |
| R13 = ∞ | D13 = 1.50 | N8 = 1.62041 | ν8 = 60.3 |
| R14 = −26.19 | D14 = 2.70 | | |
| R15 = 26.19 | D15 = 1.50 | N9 = 1.62041 | ν9 = 60.3 |
| R16 = ∞ | | | |

| | 2ω | | |
|---|---|---|---|
| D | 49.4° | 40.4° | 34° |
| D3 | 1.55 | 0.65 | 0.06 |
| D8 | 15.39 | 17.95 | 20.51 |

$R_A/R_B = -0.0146$
$R_D/R_C = 0.112$

Numerical Example 5
(FIGS. 6 and 11A-11C)

$2\omega = 49.4°-34°$

| | | | |
|---|---|---|---|
| R1 = −6.19 | D1 = 1.00 | N1 = 1.84666 | ν1 = 23.9 |
| R2 = −78.06 | D2 = Variable | | |
| R3 = −32.00 | D3 = 3.00 | N2 = 1.88300 | ν2 = 40.8 |
| R4 = −5.65 | D4 = Variable | | |
| R5 = 15.50 | D5 = 3.00 | N3 = 1.77250 | ν3 = 49.6 |
| R6 = −4385.48 | D6 = 2.11 | | |
| R7 = ∞ | D7 = 20.00 | N4 = 1.51633 | ν4 = 64.1 |
| R8 = ∞ | D8 = 2.50 | | |
| R9 = ∞ | D9 = 1.50 | N5 = 1.62041 | ν5 = 60.3 |
| R10 = −26.19 | D10 = 2.70 | | |
| R11 = 26.19 | D11 = 1.50 | N6 = 1.62041 | ν6 = 60.3 |
| R12 = ∞ | | | |

| | 2ω | | |
|---|---|---|---|
| D | 49.4° | 40.4° | 34° |
| D2 | 2.87 | 1.69 | 0.90 |
| D4 | 16.54 | 19.25 | 21.56 |

$R_A/R_B = 0.079$
$R_D/R_C = 0.177$

What is claimed is:

1. A variable magnification finder comprising, from front to rear, a first lens group or unit of negative power, a second lens group or unit of positive power, a third lens unit of positive power, the first, second and third lens units constituting an objective lens whose overall refractive power is positive, and an eyepiece of positive power, said first and said second lens groups or units forming a finder image on or near said third lens unit, wherein, when a magnification of the finder is varied from a low magnification to a high magnification, said second lens group or unit is moved toward an object side and at the same time, said first lens group or unit is also moved.

2. A variable magnification finder according to claim 1, wherein said first lens group or unit includes a negative lens having a front surface concave toward the front, and said second lens group or unit includes a positive lens having a rear surface convex toward said eyepiece, said negative and said positive lenses satisfying the following conditions:

$$-0.8 \leq R_A/R_B \leq 0.5$$
$$-0.5 \leq R_D/R_C < 0.8$$

where $R_A$ and $R_B$ are radii of curvature of front and rear surfaces of said negative lens, respectively, and $R_C$ and $R_D$ are radii of curvature of front and rear surfaces of said positive lens, respectively.

3. A variable magnification finder according to claim 2, wherein said first lens group or unit includes one lens of negative power.

4. A variable magnification finder according to claim 3, wherein said first lens group or unit lens of negative power is a cemented lens.

5. A variable magnification finder according to claim 2, wherein said first lens group or unit includes a plurality of lenses of negative power.

6. A variable magnification finder according to claim 2, wherein said second lens group or unit includes one lens of positive power.

7. A variable magnification finder according to claim 2, wherein said second lens group or unit includes a plurality of lenses of positive power.

8. A variable magnification finder comprising, from front to rear:
   (a) a first lens group or unit of negative power;
   (b) a second lens group or unit of positive power;
   (c) a third lens unit having a positive refractive power positioned near an imaging plane formed by said first and second lens groups or units;
   (d) a prism having a reflective plane for inverting an image formed by said first and second lens groups or units, up and down and left and right; and
   (e) an eyepiece having a positive refractive power for observing an image formed by said first and second lens groups or units, wherein variable magnification is achieved by moving said first and second lens groups or units in the direction of the optical axis.

9. A variable magnification finder according to claim 8, wherein said first lens group or unit includes a negative lens having a front surface concave toward the front, and said second lens group or unit includes a positive lens having a rear surface convex toward said eyepiece, said negative and said positive lenses satisfying the following conditions:

$$-0.8 \leq R_A/R_B \leq 0.5$$
$$-0.5 \leq R_D/R_C < 0.8$$

where $R_A$ and $R_B$ are radii of curvature of front and rear surfaces of said negative lens, respectively, and $R_C$ and $R_D$ are radii of curvature of front and rear surfaces of said positive lens, respectively.

10. A variable magnification finder according to claim 9, wherein said first lens group or unit includes one lens of negative power.

11. A variable magnification finder according to claim 10, wherein said first lens group or unit of negative power is a cemented lens.

12. A variable magnification finder according to claim 9, wherein said first lens group or unit includes a plurality of lenses of negative power.

13. A variable magnification finder according to claim 9, wherein said second lens group or unit includes one lens of positive power.

14. A variable magnification finder according to claim 9, wherein said second lens group or unit includes a plurality of lenses of positive power.

15. A variable magnification finder comprising, from front to rear:
   (a) a first lens group or unit of negative power;
   (b) a second lens group or unit of positive power;
   (c) a third lens unit having a positive refractive power positioned on or near an imaging plane formed by said first and second lens groups;
   (d) optical means for inverting an image formed by said first and second lens groups or units; and
   (e) an eyepiece having a positive refractive power for observing an image formed by said first and second lens groups or units, wherein variable magnification is achieved by changing air space between said first and second lens groups or units.

16. A variable magnification finder according to claim 15, wherein said first lens group or unit includes a negative lens having a front surface concave toward the front, and said second lens group or unit includes a positive lens having a rear surface convex toward said eyepiece, said negative and said positive lenses satisfying the following conditions:

$$-0.8 \leq R_A/R_B \leq 0.5$$
$$-0.5 \leq R_D/R_C < 0.8$$

where $R_A$ and $R_B$ are radii of curvature of front and rear surfaces of said negative lens, respectively, and $R_C$ and $R_D$ are radii of curvature of front and rear surfaces of said positive lens, respectively.

17. A variable magnification finder according to claim 15, wherein said first lens group or unit includes one lens of negative power.

18. A variable magnification finder according to claim 15, wherein said first lens group or unit of negative power is a cemented lens.

19. A variable magnification finder according to claim 15, wherein said first lens group or unit includes a plurality of lenses of negative power.

20. A variable magnification finder according to claim 15, wherein said second lens group or unit includes one lens of positive power.

21. A variable magnification finder according to claim 15, wherein said second lens group or unit includes a plurality of lenses of positive power.

* * * * *